US012798331B2

(12) United States Patent
Lee

(10) Patent No.: US 12,798,331 B2
(45) Date of Patent: Nov. 17, 2026

(54) SYSTEM AND METHOD FOR CONTROLLING SWITCHING BETWEEN INDOOR AIR RECIRCULATION MODE AND OUTDOOR AIR RECIRCULATION MODE OF VEHICLE

(71) Applicants: HYUNDAI MOTOR COMPANY, Seoul (KR); KIA CORPORATION, Seoul (KR)

(72) Inventor: Tae Hee Lee, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 19/061,435

(22) Filed: Feb. 24, 2025

(65) Prior Publication Data

US 2026/0034854 A1 Feb. 5, 2026

(30) Foreign Application Priority Data

Aug. 5, 2024 (KR) ........................ 10-2024-0103547

(51) Int. Cl.
*B60H 1/00* (2006.01)

(52) U.S. Cl.
CPC ..... *B60H 1/00849* (2013.01); *B60H 1/00764* (2013.01); *B60H 1/008* (2013.01)

(58) Field of Classification Search
CPC ....................... B60H 1/00849; B60H 1/00764; B60H 1/008; B60H 1/00785; B60S 1/46
See application file for complete search history.

(56) References Cited

U.S. PATENT DOCUMENTS 9,701,173 B2 7/2017 Jackson et al.
2012/0252339 A1* 10/2012 Senthil .............. B60H 1/00785 454/75

(Continued)

FOREIGN PATENT DOCUMENTS

JP H02303923 A * 12/1990
JP H 03295717 A 12/1991

(Continued)

OTHER PUBLICATIONS

KR 20190138362 A English Translation of the Description (Year: 2019).*

(Continued)

*Primary Examiner* — Tyler D Paige
*Assistant Examiner* — Alexander V Gentile
(74) *Attorney, Agent, or Firm* — MCDONNELL BOEHNEN HULBERT & BERGHOFF LLP

(57) ABSTRACT

Disclosed are a system and a method for controlling switching between an indoor air recirculation mode and an outdoor air recirculation mode of a vehicle, including a washer fluid spray switch, a weather information provider, a rain detection sensor that provides rainfall information, a windshield wiper switch that provides a windshield wiper operation level signal, and a vehicle speed sensor. A controller receives an ON operation signal from the washer fluid spray switch, changes an operation mode of an HVAC system from the outdoor air recirculation mode to the indoor air recirculation mode, and controls adjusting a time for returning the indoor air recirculation mode to the outdoor air recirculation mode to be different from a reference time, on the basis of the information or signals provided from the weather information provider, the rain detection sensor, the windshield wiper switch, and the vehicle speed sensor.

12 Claims, 5 Drawing Sheets

(56) References Cited

U.S. PATENT DOCUMENTS

| | | | | |
|---|---|---|---|---|
| 2017/0106715 | A1* | 4/2017 | Duan | B60H 1/00764 |
| 2020/0276880 | A1* | 9/2020 | Saito | B60H 1/00785 |

FOREIGN PATENT DOCUMENTS

| | | | | | |
|---|---|---|---|---|---|
| KR | 20-0422521 | Y | | 7/2006 | |
| KR | 20150007638 | A | * | 1/2015 | B60S 1/46 |
| KR | 2018-0095252 | A | | 8/2018 | |
| KR | 20190138362 | A | * | 12/2019 | B60S 1/481 |
| KR | 2022-0086077 | A | | 6/2022 | |
| WO | WO-2025109914 | A1 | * | 5/2025 | B60H 1/00 |

OTHER PUBLICATIONS

KR 20150007638 A English Translation of the Description (Year: 2015).*

WO2025109914A1 English Translation of the Description (Year: 2025).*

JPH02303923A English Translation of the Description (Year: 1990).*

* cited by examiner

SYSTEM AND METHOD FOR CONTROLLING SWITCHING BETWEEN INDOOR AIR RECIRCULATION MODE AND OUTDOOR AIR RECIRCULATION MODE OF VEHICLE

CROSS-REFERENCE TO RELATED APPLICATION

This application claims, under 35 U.S.C. § 119(a), the benefit of priority to Korean Patent Application No. 10-2024-0103547 filed on Aug. 5, 2024, the entire contents of which are incorporated herein by reference.

BACKGROUND

(a) Technical Field

The present disclosure relates to a system for controlling switching between an indoor air recirculation mode and an outdoor air recirculation mode of a vehicle and a method therefor, and more particularly, to a system for controlling switching between an indoor air recirculation mode and an outdoor air recirculation mode of a vehicle and a method therefor, capable of optimizing, after switching from the outdoor air recirculation mode to the indoor air recirculation mode when washer fluid is sprayed, the time for returning the indoor air recirculation mode to the outdoor air recirculation mode according to weather information, a windshield wiper operation level, and the like.

(b) Background Art

In general, air may be supplied to a cabin of a vehicle using an outdoor air recirculation mode and an indoor air recirculation mode of an HVAC system.

In the outdoor air recirculation mode of the HVAC system, in a case where a switching door of an HVAC case provided in the HVAC system is opened toward outside air, the outside air may flow into the vehicle cabin. On the other hand, in the indoor air recirculation mode of the HVAC system, in a situation where the switching door of the HVAC case is opened toward inside air, the inside air may circulate in the vehicle cabin.

Accordingly, in a situation where the indoor air recirculation mode is changed to the outdoor air recirculation mode for cabin ventilation while the vehicle is traveling, outside air may be introduced through an air inlet of a cowl top panel located between an engine compartment and a windshield glass and supplied to the vehicle cabin. On the other hand, in a situation in which the outdoor air recirculation mode is changed to the indoor air recirculation mode while the vehicle is traveling in a tunnel, an underground parking lot, or other areas where bad odors occur, the inflow of bad odors, may be blocked from the outside.

A washer fluid spray device is provided inside and outside the engine compartment of the vehicle to spray washer fluid toward the windshield glass to wipe away dust and contaminants on the windshield glass.

Typically, the washer fluid spray device includes a washer fluid spray switch, a washer fluid storage tank, a washer fluid pumping motor for pumping washer fluid in the washer fluid storage tank toward a spray nozzle, a controller for driving the washer fluid pumping motor for a predetermined period of time when the washer fluid spray switch is turned on, and the spray nozzle mounted at a predetermined position of a hood for opening and closing the engine compartment.

Accordingly, by driving the washer fluid pumping motor for a certain period of time according to a driving signal of the controller, the washer fluid in the washer fluid storage tank may be sprayed onto the windshield glass through the spray nozzle.

However, in situations in which the washer fluid is sprayed onto the windshield glass in the outdoor air recirculation mode of the HVAC system, washer fluid odor (e.g., alcohol odor) may enter the vehicle cabin through the air inlet of the cowl top panel located between the engine compartment and the windshield glass, and the washer fluid odor entering the cabin may cause an unpleasant odor to a driver and passengers.

As a related technology for solving such problems, when a washer fluid is sprayed onto a windshield glass in an outdoor air recirculation mode of an HVAC system, that is, when a washer fluid pumping motor is driven for a certain period of time by a drive signal of a controller, in order to prevent washer fluid odor from entering a vehicle cabin, a method for controlling switching between an indoor air recirculation mode and an outdoor air recirculation mode, in which an operation mode of the HVAC system is automatically changed from the outdoor air recirculation mode to the indoor air recirculation mode, and then, the operation mode of the HVAC system is automatically returned from the indoor air recirculation mode to the outdoor air recirculation mode after a predetermined reference time, is applied.

However, even when the operation mode of the HVAC system is changed from the outdoor air recirculation mode to the indoor air recirculation mode to prevent the washer fluid odor from entering the cabin and then automatically returns from the indoor air recirculation mode to the outdoor air recirculation mode after a predetermined reference time, there is a problem in which the washer fluid odor (e.g., alcohol odor) remaining on the windshield glass and its surroundings is re-introduced into the cabin.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to solve the above-described problems associated with prior art, and an object of the present disclosure is to provide a system for controlling switching between an indoor air recirculation mode and an outdoor air recirculation mode of a vehicle, and a method therefor, capable of primarily preventing a washer fluid odor from entering a vehicle cabin as an operation mode of an HVAC system is automatically changed from the outdoor air recirculation mode to the indoor air recirculation mode in a case where washer fluid is sprayed onto a windshield glass in the outdoor air recirculation mode of the HVAC system, and optimally increasing or decreasing a time for returning the indoor air recirculation mode to the outdoor air recirculation mode compared to a preset reference time according to weather information, rainfall, a wiper operation level, a vehicle speed, and a washer fluid odor concentration, thereby making it possible to prevent the residual washer fluid odor from entering the vehicle cabin.

In one aspect, the present disclosure provides a system for controlling switching between an indoor air recirculation mode and an outdoor air recirculation mode of a vehicle including a washer fluid spray switch, a weather information provider that provides weather information to a controller, a rain detection sensor that provides rainfall information to the controller, a windshield wiper switch that provides a windshield wiper operation level signal to the controller, a vehicle speed sensor that provides a current vehicle speed detection signal of the vehicle to the controller, and the controller configured to receive an ON operation signal from the washer fluid spray switch, to change an operation mode of an HVAC system from the outdoor air recirculation mode to the indoor air recirculation mode, and to perform control for adjusting a time for returning the indoor air recirculation mode to the outdoor air recirculation mode to be different from a reference time, on the basis of the information or signals provided from the weather information provider, the rain detection sensor, the windshield wiper switch, and the vehicle speed sensor.

In a preferred embodiment, the controller may control decreasing the time to return the indoor air recirculation mode to the outdoor air recirculation mode to be shorter than the reference time in case of rain, on the basis of the weather information provided from the weather information provider, and may perform control for increasing the time for returning the indoor air recirculation mode to the outdoor air recirculation mode to be longer than the reference time in case of non-rain.

In another preferred embodiment, the controller may control decreasing the time to return the indoor air recirculation mode to the outdoor air recirculation mode to be shorter than the reference time when a rainfall amount is equal to or greater than a set amount, on the basis of the rainfall information provided from the rain detection sensor, and may perform control for increasing the time for returning the indoor air recirculation mode to the outdoor air recirculation mode to be longer than the reference time when the rainfall amount is less than the set amount.

In still another preferred embodiment, the controller may control decreasing the time to return the indoor air recirculation mode to the outdoor air recirculation mode to be shorter than the reference time in a case where a windshield wiper operation level is a low or high level, on the basis of the windshield wiper operation level signal provided from the windshield wiper switch, and may control increasing the time for returning the indoor air recirculation mode to the outdoor air recirculation mode to be longer than the reference time in a case where the windshield wiper operation level is an intermediate level.

In yet another preferred embodiment, the controller may control decreasing the time to return the indoor air recirculation mode to the outdoor air recirculation mode to be shorter than the reference time in a case where the vehicle speed is equal to or higher than a reference vehicle speed, on the basis of the vehicle speed detection signal, and may control increasing the time to return the indoor air recirculation mode to the outdoor air recirculation mode to be longer than the reference time in a case where the vehicle speed is lower than the reference vehicle speed.

In still yet another preferred embodiment, the system may further include an odor sensor that measures an odor concentration of washer fluid flowing into a cabin of the vehicle and provides an odor concentration signal to the controller.

In a further preferred embodiment, the controller may receive the ON operation signal from the washer fluid spray switch to change the operation mode of the HVAC system from the outdoor air recirculation mode to the indoor air recirculation mode, may control decreasing the time to return the indoor air recirculation mode to the outdoor air recirculation mode to be shorter than the reference time in a case where the odor concentration of the washer fluid is lower than a reference concentration, on the basis of the odor concentration signal from the odor sensor, and may control increasing the time to return the indoor air recirculation mode to the outdoor air recirculation mode to be longer than the reference time in a case where the odor concentration of the washer fluid is higher than the reference concentration.

In another aspect, the present disclosure provides a method for controlling switching between an indoor air recirculation mode and an outdoor air recirculation mode of a vehicle, the method including changing an operation mode of an HVAC system from the outdoor air recirculation mode to the indoor air recirculation mode by a controller that receives an ON operation signal from a washer fluid spray switch, providing weather information to the controller from a weather information provider, providing rainfall information to the controller from a rain detection sensor, providing a windshield wiper operation level signal to the controller from a windshield wiper switch, providing a current vehicle speed detection signal of the vehicle to the controller from a speed sensor, and performing control for adjusting a time for returning the indoor air recirculation mode to the outdoor air recirculation mode to be different from a reference time on the basis of the information or signals provided from the weather information provider, the rain detection sensor, the windshield wiper switch, and the vehicle speed sensor by the controller.

In a preferred embodiment, the controller may control decreasing the time for returning the indoor air recirculation mode to the outdoor air recirculation mode to be shorter than the reference time in case of rain, and may control increasing the time for returning the indoor air recirculation mode to the outdoor air recirculation mode to be longer than the reference time in case of non-rain, on the basis of the weather information provided from the weather information provider.

In another preferred embodiment, the controller may control decreasing the time for returning the indoor air recirculation mode to the outdoor air recirculation mode to be shorter than the reference time when a rainfall amount is equal to or greater than a set amount, on the basis of the rainfall information provided from the rain detection sensor, and may control increasing the time for returning the indoor air recirculation mode to the outdoor air recirculation mode to be longer than the reference time when the rainfall amount is less than the set amount.

In still another preferred embodiment, the controller may control decreasing the time for returning the indoor air recirculation mode to the outdoor air recirculation mode to be shorter than the reference time in a case where a windshield wiper operation level is a low or high level, on the basis of the windshield wiper operation level signal provided from the windshield wiper switch, and may perform control for increasing the time for returning the indoor air recirculation mode to the outdoor air recirculation mode to be longer than the reference time in a case where the windshield wiper operation level is an intermediate level.

In yet another preferred embodiment, the controller may control for decreasing the time for returning the indoor air recirculation mode to the outdoor air recirculation mode to be shorter than the reference time in a case where a vehicle speed is equal to or higher than a reference vehicle speed, on the basis of the vehicle speed detection signal, and may perform control for increasing the time for returning the indoor air recirculation mode to the outdoor air recirculation mode to be longer than the reference time in a case where the vehicle speed is lower than the reference vehicle speed.

In still yet another preferred embodiment, the method may further include measuring an odor concentration of washer fluid flowing into a cabin of the vehicle and providing an order concentration signal from the odor sensor to the controller.

In a further preferred embodiment, the controller may receive the ON operation signal from the washer fluid spray switch to change the operation mode of the HVAC system from the outdoor air recirculation mode to the indoor air recirculation mode, and then, may perform control for decreasing the time for returning the indoor air recirculation mode to the outdoor air recirculation mode to be shorter than the reference time in a case where the odor concentration of the washer fluid is lower than a reference concentration, on the basis of the odor detection signal from the odor sensor, and may perform control for increasing the time for returning the indoor air recirculation mode to the outdoor air recirculation mode to be longer than the reference time in a case where the odor concentration of the washer fluid is equal to or higher than the reference concentration.

Other aspects and preferred embodiments of the disclosure are discussed infra.

BRIEF DESCRIPTION OF THE DRAWINGS

The above and other features of the present disclosure will be described in detail with reference to certain exemplary embodiments thereof illustrated the accompanying drawings which are given hereinafter by way of illustration only, and thus are not limitative of the present disclosure, and wherein.

Figure 1:
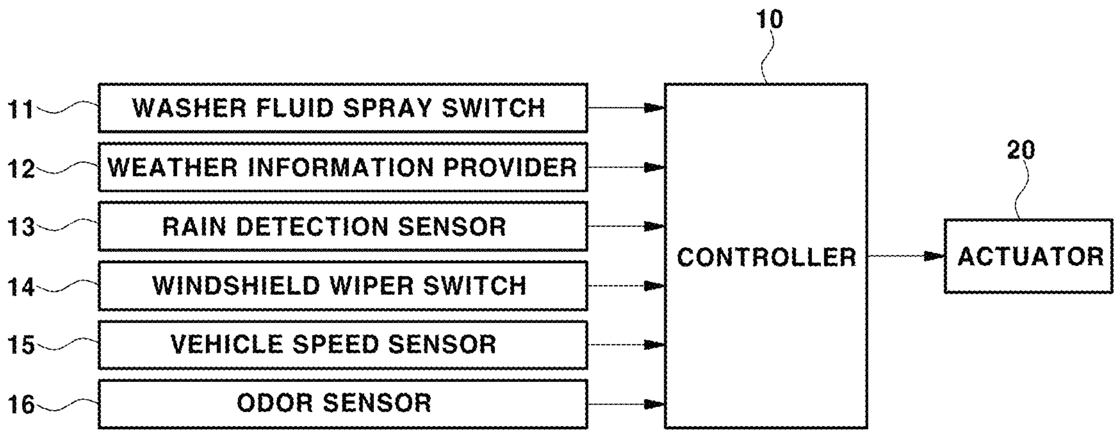
FIG. 1 is a system for controlling switching between an indoor air recirculation mode and an outdoor air recirculation mode of a vehicle according to an embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, reference will be made in detail to various embodiments of the present disclosure, examples of which are illustrated in the accompanying drawings and described below. While the disclosure will be described in conjunction with exemplary embodiments, it will be understood that the present description is not intended to limit the disclosure to the exemplary embodiments. On the contrary, the disclosure is intended to cover not only the exemplary embodiments, but also various alternatives, modifications, equivalents and other embodiments, within the spirit and scope of the disclosure as defined by the appended claims.

It will be understood that, although the terms "first", "second", etc. may be used herein to describe various elements, these elements should not be limited by these terms. These terms are only used to distinguish one element from another. For example, a first element may be termed a second element, and, similarly, a second element may be termed a first element, without departing from the scope of the exemplary embodiments of the present disclosure.

In addition, it will be understood that, when an element is "connected" or "coupled" to another element, it may be directly connected or coupled to the other element, or may be indirectly connected or coupled to the other element with a different element being interposed therebetween. In contrast, when an element is "directly connected" or "directly coupled" to another element, this means that there is no intervening element therebetween. Other expressions used to describe the relationship between elements should be interpreted in a similar manner (for example, "between" and "directly between", "adjacent" and "directly adjacent", etc.).

Wherever possible, the same reference numbers will be used throughout the drawings to refer to the same or like parts. The terminology used herein is for the purpose of describing particular embodiments only and is not intended to limit exemplary embodiments of the disclosure. As used herein, the singular forms "a", "an", and "the" are intended to include the plural forms as well, unless the context clearly indicates otherwise. It will be further understood that the terms "comprise", "include", and "have" used herein specify the presence of stated components, steps, operations, and/or elements, but do not preclude the presence or addition of one or more other components, steps, operations, and/or elements.

Hereinafter, preferred embodiments of the present disclosure will be described in detail with reference to the accompanying drawings.

FIG. 1 depicts a system for controlling switching between an indoor air recirculation mode and an outdoor air recirculation mode of a vehicle, according to an embodiment of the present disclosure.

The system for controlling switching between the indoor air recirculation mode and the outdoor air recirculation mode of the vehicle according to the present embodiment includes a washer fluid spray switch 11, a weather information provider 12 that provides weather information to a controller 10, a rain detection sensor 13 that provides rainfall information to the controller 10, a windshield wiper switch 14 that provides a windshield wiper operation level signal to the controller 10, and a vehicle speed sensor 15 that provides a current vehicle speed detection signal to the controller 10.

The washer fluid spray switch 11 is provided around a driver's seat. In a case where a driver turns on the washer fluid spray switch 11, a washer fluid pumping motor is operated for a certain period of time by a driving signal of the controller 10, so that the washer fluid in a washer fluid storage tank can be sprayed onto a windshield glass through a spray nozzle.

Here, in a case where the washer fluid is sprayed onto the windshield glass in an outdoor air recirculation mode of an HVAC system, there is a problem in that washer fluid odor (e.g., alcohol odor) may pass through an air inlet of a cowl top panel located between an engine compartment and the windshield glass to enter a cabin of the vehicle, and thus, the washer fluid odor entering the cabin may cause an unpleasant odor to the driver and passengers.

In order to solve such a problem, in a case where the controller 10 receives an ON operation signal from the washer fluid spray switch 11, the controller 10 changes an operation mode of the HVAC system from the outdoor air recirculation mode to the indoor air recirculation mode, and then performs control for automatically returning the operation mode of the HVAC system from the indoor air recirculation mode to the outdoor air recirculation mode after a predetermined reference time elapses, thereby making it possible to primarily prevent the washer fluid odor from entering the vehicle cabin.

For example, in a case where the controller 10 receives the ON operation signal from the washer fluid spray switch 11, the controller 10 applies a driving signal to an actuator 20 for rotating a mode switch door of an HVAC case so that the mode switch door is opened toward an inside air passage, thereby allowing the mode switch door to be disposed at a position for closing an outside air passage and opening the inside air passage at the same time, so that the washer fluid odor flowing into the vehicle cabin through the outside air passage can be primarily blocked.

However, in a case where the operation mode of the HVAC system is changed from the outdoor air recirculation mode to the indoor air recirculation mode to prevent the washer fluid odor from entering the cabin, and then, the operation mode of the HVAC system automatically returns from the indoor air recirculation mode to the outdoor air recirculation mode after a predetermined reference time, there is a problem in that the washer fluid odor remaining on the windshield glass and its surroundings is introduced into the cabin again.

Accordingly, the present disclosure proposes a technique for optimally increasing or decreasing, after the operation mode of the HVAC system is changed from the outdoor air recirculation mode to the indoor air recirculation mode to prevent the washer fluid odor from entering the cabin, the time for automatically returning the indoor air recirculation mode to the outdoor air recirculation mode, compared with a predetermined reference time, on the basis of weather information, rainfall, a windshield wiper operation level, a vehicle speed, a washer fluid odor concentration, and the like, thereby effectively preventing the residual washer fluid odor from entering the cabin.

To this end, the weather information provider 12 provides current weather information to the controller 10, the rain detection sensor 13 provides information on the amount of rainfall accumulated on the windshield glass to the controller 10, the windshield wiper switch 14 provides a windshield wiper operation level signal to the controller 10, and the vehicle speed sensor 15 provides a current vehicle speed detection signal to the controller 10.

The weather information provider 12 may be configured as a navigation or smart device provided in the vehicle that provides weather information, or the like via the Internet.

The rain detection sensor 13 is mounted on a crash pad inside the vehicle and is located on the inside of the windshield glass, and is configured to detect the amount of rainfall accumulated on the windshield glass and to transmit the detected rainfall information to the controller 10.

The windshield wiper switch 14 is configured to adjust a wiping speed of the windshield wiper to an intermediate level, a low level, a high level, or the like, and to provide a windshield wiper operation level signal at any one of the intermediate level, the low level, and the high level to the controller 10.

In particular, the controller 10 receives the ON operation signal from the washer fluid spray switch 11, performs control for changing the operation mode of the HVAC system from the outdoor air recirculation mode to the indoor air recirculation mode, and then, performs control for increasing or decreasing the time for returning the operation mode of the HVAC system from the indoor air recirculation mode to the outdoor air recirculation mode, on the basis of any one of the information or signals provided from the weather information provider 12, the rain detection sensor 13, the windshield wiper switch 14, and the vehicle speed sensor 15, compared to a predetermined reference time (e.g., 1 minute).

As an example, the controller 10 may perform control for decreasing the time for returning the indoor air recirculation mode to the outdoor air recirculation mode to be shorter than the reference time in case of rain on the basis of the weather information provided from the weather information provider 12, and may perform control for increasing the time for returning the indoor air recirculation mode to the outdoor air recirculation mode to be longer than the reference time in case of non-rain (e.g., clear weather).

More specifically, in rainy weather, the washer fluid sprayed onto the windshield glass by the ON operation of the washer fluid spray switch 11 may be mixed with rainwater or be washed away by rainwater, thereby reducing the washer fluid odor. Accordingly, the time for returning the operation mode of the HVAC system from the indoor air recirculation mode to the outdoor air recirculation mode in rainy weather may be adjusted to be shorter than the reference time under the control of the controller.

On the other hand, in non-rainy weather (e.g., clear weather), the washer fluid may remain on the windshield glass and cowl top panel, and the odor of the residual washer fluid may continue to flow into the cabin. Therefore, in non-rainy weather, the time for returning the operation mode of the HVAC system from the indoor air recirculation mode to the outdoor air recirculation mode may be adjusted to be longer than the reference time under the control of the controller, thereby preventing the odor of the residual washer fluid from entering the cabin.

As another example, the controller 10 may perform control for decreasing the time for returning the operation mode of the HVAC system from the indoor air recirculation mode to the outdoor air recirculation mode to be shorter than the reference time in a case where a rainfall amount is equal to or greater than a set amount on the basis of the rainfall information provided from the rain detection sensor 13, and may perform control for increasing the time for returning the operation mode of the HVAC system from the indoor air recirculation mode to the outdoor air recirculation mode to be longer than the reference time in a case where the rainfall amount is less than the set amount.

More specifically, since the washer fluid sprayed onto the windshield glass by the ON operation of the washer fluid spray switch 11 may be washed away by rainfall of the set amount or greater to thereby reduce the washer fluid odor, in a case where the rainfall is equal to or greater than the set amount, the time for returning the indoor air recirculation mode to the outdoor air recirculation mode may be adjusted to be shorter than the reference time under the control of the controller.

On the other hand, in a case where the rainfall is less than the set amount, the washer fluid may remain on the windshield glass and cowl top panel, and the odor of the residual washer fluid may continue to flow into the cabin. Therefore, in a case where the rainfall is less than the set amount, the time for returning the indoor air recirculation mode to the outdoor air recirculation mode may be adjusted to be longer than the reference time under the control of the controller, thereby preventing the odor of the residual washer fluid from entering the cabin.

As a still another example, the controller 10 may perform control for decreasing the time for returning the operation mode of the HVAC system from the indoor air recirculation mode to the outdoor air recirculation mode to be shorter than the reference time in a case where a windshield wiper operation level is a low or high level, on the basis of the windshield wiper operation level signal provided from the windshield wiper switch 14, and may perform control for increasing the time for returning the operation mode of the HVAC system from the indoor air recirculation mode to the outdoor air recirculation mode to be longer than the reference time in a case where the windshield wiper operation level is an intermediate level.

More specifically, since the washer fluid sprayed onto the windshield glass according to the ON operation of the washer fluid spray switch 11 may be washed away by repeated wiping according to the low or high level speed of the windshield wiper to thereby reduce the washer fluid odor, in a case where the windshield wiper operation level is low or high, the time for returning the indoor air recirculation mode to the outdoor air recirculation mode may be adjusted to be shorter than the reference time under the control of the controller.

On the other hand, in a case where the windshield wiper operation level is the intermediate level at which intermittent wiping is performed at a predetermined time cycle of the windshield wiper, the washer fluid may remain on the windshield glass and the cowl top panel, and the odor of the residual washer fluid may continue to flow into the cabin. Therefore, in a case where the windshield wiper operation level is the intermediate level, the time for returning the indoor air recirculation mode to the outdoor air recirculation mode may be adjusted to be longer than the reference time under the control of the controller, thereby preventing the odor of the residual washer fluid from entering the cabin.

As a further still another example, the controller 10 may perform control for decreasing the time for returning the operation mode of the HVAC system from the indoor air recirculation mode to the outdoor air recirculation mode to be shorter than the reference time in a case where a vehicle speed is equal to or higher than a reference vehicle speed, on the basis of the signal of the vehicle speed sensor 15, and may perform control for increasing the time for returning the operation mode of the HVAC system from the indoor air recirculation mode to the outdoor air recirculation mode to be longer than the reference time in a case where the vehicle speed is lower than the reference vehicle speed.

More specifically, since the washer fluid sprayed onto the windshield glass by the ON operation of the washer fluid spray switch 11 may be quickly removed from the windshield glass due to vehicle wind generated at a vehicle speed that is equal to or higher than the reference vehicle speed to thereby reduce the washer fluid odor, in a case where the vehicle speed is equal to or higher than the reference vehicle speed, the time for returning the indoor air recirculation mode to the outdoor air recirculation mode may be adjusted to be shorter than the reference time under the control of the controller.

On the other hand, in a case where the vehicle speed is lower than the reference vehicle speed, the washer fluid may remain on the windshield glass and cowl top panel even when the vehicle wind acts on the windshield glass, and the odor of the residual washer fluid may continue to flow into the cabin. Therefore, in a case where the vehicle speed is lower than the reference vehicle speed, the time for returning the indoor air recirculation mode to the outdoor air recirculation mode may be adjusted to be longer than the reference time under the control of the controller, thereby preventing the odor of the residual washer fluid from entering the cabin.

The system for controlling switching between the indoor air recirculation mode and the outdoor air recirculation mode of the vehicle according to the present disclosure is configured to further include an odor sensor 16 that measures an odor concentration of washer fluid flowing into the vehicle cabin and provides an odor concentration signal to the controller 10.

The odor sensor 16 may be provided on the air inlet side of the cowl top panel to measure the odor concentration of the washer fluid flowing into the vehicle cabin, and may be one of an electrochemical odor sensor, an electrochemical odor sensor array, a bio-peptide type sensor, a sensor using amino acids, and the like.

Accordingly, the controller 10 may receive the ON operation signal from the washer fluid spray switch 11 to change the outdoor air recirculation mode of the HVAC system to the indoor air recirculation mode, and then, may perform control for decreasing the time for returning the operation mode of the HVAC system from the indoor air recirculation mode to the outdoor air recirculation mode to be shorter than the reference time when the odor concentration of the washer fluid is lower than a reference concentration, on the basis of an odor concentration signal from the odor sensor 16, and perform control for increasing the time for returning the operation mode of the HVAC system from the indoor air recirculation mode to the outdoor air recirculation mode to be longer than the reference time when the odor concentration of the washer fluid is equal to or higher than the reference concentration.

Here, several embodiments of a control method for switching between indoor and outdoor air recirculation modes of a vehicle according to the present disclosure are as follows.

Figure 2:
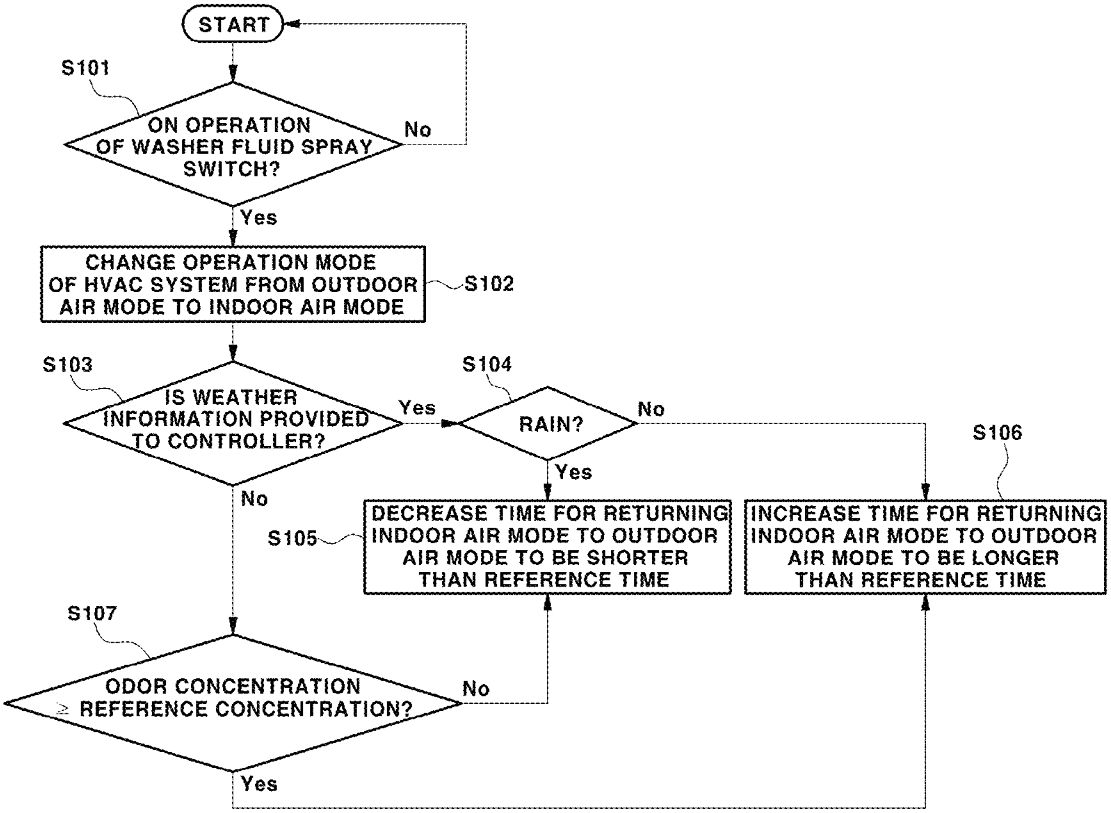
FIG. 2 is a flowchart illustrating a method for controlling switching between an indoor air recirculation mode and an outdoor air recirculation mode of a vehicle according to an embodiment of the present disclosure.

FIG. 2 is a flowchart illustrating a method for controlling switching between an indoor air recirculation mode and an outdoor air recirculation mode of a vehicle according to an embodiment of the present disclosure.

First, the controller 10 determines whether an ON operation signal of the washer fluid spray switch 11 is received (S101).

Then, in a case where the ON operation signal is received from the washer fluid spray switch 11, the controller 10 controls for changing the operation mode of the HVAC system from the outdoor air recirculation mode to the indoor air recirculation mode (S102).

Accordingly, as the operation mode of the HVAC system is changed from the outdoor air recirculation mode to the indoor air recirculation mode, it is possible to primarily prevent the washer fluid odor from entering the vehicle cabin.

Then, the controller 10 determines whether weather information is provided from the weather information provider 12 (S103).

In a case where the controller 10 receives the weather information from the weather information provider 12, the controller 10 determines whether it is a rainy or non-rainy condition on the basis of the weather information provided from the weather information provider 12 (S104), and then, in a case where it is the rainy condition, the controller 10 controls for decreasing the time for returning the indoor air recirculation mode to the outdoor air recirculation mode to be shorter than a preset reference time (e.g., 1 minute) (S105), and in a case where it is the non-rainy condition (e.g., clear weather), the controller 10 controls for increasing the time for returning the indoor air recirculation mode to the outdoor air recirculation mode to be longer than the preset reference time (S106).

Accordingly, since the washer fluid sprayed onto the windshield glass in rainy weather may be mixed with rainwater or washed away by the rainwater to thereby reduce the washer fluid odor, the time for returning the indoor air recirculation mode to the outdoor air recirculation mode may be shortened. On the other hand, in non-rainy weather (e.g., clear weather), since the odor of the washer fluid remaining on the windshield glass and cowl top panel may continue to flow into the cabin, the time for returning the indoor air recirculation mode to the outdoor air recirculation mode may be increased, thereby easily preventing the odor of the residual washer fluid from entering the cabin.

In a case where it is determined in step S103 that the weather information is not provided to the controller 10, a step of measuring an odor concentration of the washer fluid flowing into the vehicle cabin from the odor sensor 16 and a step of providing an odor concentration signal from the odor sensor 16 to the controller 10 may be performed.

Accordingly, the controller 10 receives the ON operation signal from the washer fluid spray switch 11 and changes the operation mode of the HVAC system from the outdoor air recirculation mode to the indoor air recirculation mode, and then, compares the odor concentration of the washer fluid with a reference concentration on the basis of an odor concentration signal from the odor sensor (S107).

As a result of the comparison, in a case where the odor concentration of the washer fluid is lower than the reference concentration, the controller 10 performs control for decreasing the time for returning the indoor air recirculation mode to the outdoor air recirculation mode to be shorter than the preset reference time (e.g., 1 minute) (S105), and in a case where the odor concentration of the washer fluid is equal to or higher than the reference concentration, the controller 10 controls increasing the time for returning the indoor air recirculation mode to the outdoor air recirculation mode to be longer than the reference time (S106).

Accordingly, in a case where the odor concentration of the washer fluid is lower than the reference concentration, the time for returning the indoor air recirculation mode to the outdoor air recirculation mode may be shortened, whereas in a case where the odor concentration of the washer fluid is equal to or higher than the reference concentration, since the odor of the washer fluid remaining on the windshield glass and cowl top panel may continue to flow into the vehicle cabin, the time for returning the indoor air recirculation mode to the outdoor air recirculation mode may be increased. Accordingly, it is possible to easily prevent the odor of the residual washer fluid from entering the vehicle cabin.

Figure 3:
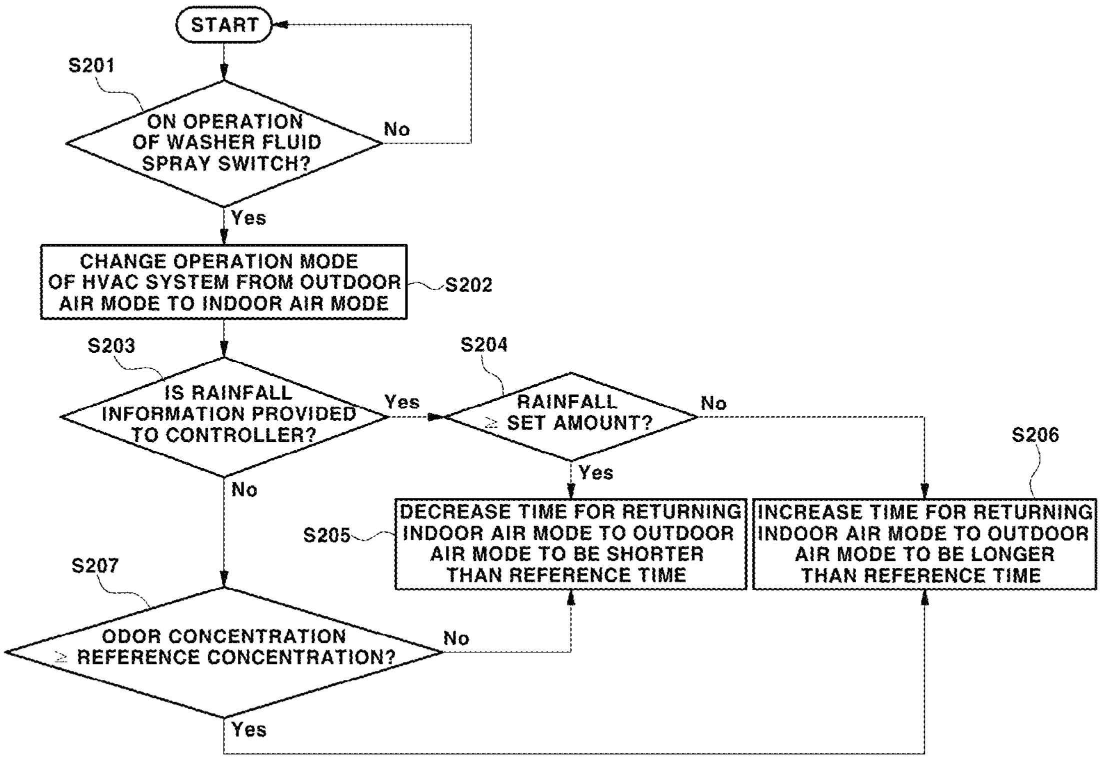
FIG. 3 is a flowchart illustrating a method for controlling switching between an indoor air recirculation mode and an outdoor air recirculation mode of a vehicle according to another embodiment of the present disclosure.

FIG. 3 is a flowchart showing a method for controlling switching between an indoor air recirculation mode and an outdoor air recirculation mode of a vehicle according to another embodiment of the present disclosure.

First, the controller 10 determines whether an ON operation signal of the washer fluid spray switch 11 is received (S201).

In a case where the controller 10 receives the ON operation signal from the washer fluid spray switch 11, the controller 10 controls changing the operation mode of the HVAC system from the outdoor air recirculation mode to the indoor air recirculation mode (S202).

Accordingly, as the operation mode of the HVAC system switches from the outdoor air recirculation mode to the indoor air recirculation mode, it is possible to primarily prevent the washer fluid odor from entering the vehicle cabin.

Then, the controller 10 determines whether rainfall information is provided from the rain detection sensor 13 (S203).

In a case where the controller 10 receives the rainfall information from the rain detection sensor 13, the controller 10 determines whether the rainfall is equal to or greater than a set amount on the basis of the rainfall information provided from the rain detection sensor 13 (S204), and then, controls decreasing the time for returning the indoor air recirculation mode to the outdoor air recirculation mode to be shorter than a preset reference time (e.g., 1 minute) in a case where the rainfall is equal to or greater than the set amount (S205), and controls increasing the time for returning the indoor air recirculation mode to the outdoor air recirculation mode to be longer than the reference time in a case where the rainfall is less than the set amount (S206).

Accordingly, in a case where the rainfall is equal to or greater than the set amount, since the washer fluid sprayed onto the windshield glass may be mixed with rainwater or washed away by the rainwater to thereby reduce the washer fluid odor, the time for returning the indoor air recirculation mode to the outdoor air recirculation mode may be shortened. On the other hand, in a case where the rainfall is less than the set amount, since the odor of the washer fluid remaining on the windshield glass and cowl top panel may continue to flow into the vehicle cabin, the time for returning the indoor air recirculation mode to the outdoor air recirculation mode may be increased, thereby easily preventing the odor of the residual washer fluid from entering the vehicle cabin.

In a case where it is determined in step S203 that the rainfall information is not provided to the controller 10, a step of measuring an odor concentration of the washer fluid flowing into the vehicle cabin from the odor sensor 16 and a step of providing an odor concentration signal from the odor sensor 16 to the controller 10 may be performed.

Accordingly, the controller 10 receives the ON operation signal from the washer fluid spray switch 11 and changes the operation mode of the HVAC system from the outdoor air recirculation mode to the indoor air recirculation mode, and then, compares the odor concentration of the washer fluid with the reference concentration on the basis of an odor concentration signal from the odor sensor (S207).

As a result of the comparison, in a case where the odor concentration of the washer fluid is lower than the reference concentration, the controller 10 controls decreasing the time for returning the indoor air recirculation mode to the outdoor air recirculation mode to be shorter than the preset reference time (e.g., 1 minute) (S205), and in a case where the odor concentration of the washer fluid is equal to or higher than the reference concentration, the controller 10 controls increasing the time for returning the indoor air recirculation mode to the outdoor air recirculation mode to be longer than the reference time (S206).

Accordingly, in a case where the odor concentration of the washer fluid is lower than the reference concentration, the time for returning the indoor air recirculation mode to the outdoor air recirculation mode may be shortened, whereas in a case where the odor concentration of the washer fluid is equal to or higher than the reference concentration, since the odor of the washer fluid remaining on the windshield glass and cowl top panel may continue to flow into the vehicle cabin, the time for returning the indoor air recirculation mode to the outdoor air recirculation mode may be increased. Accordingly, it is possible to prevent the odor of the residual washer fluid from entering the vehicle cabin.

Figure 4:
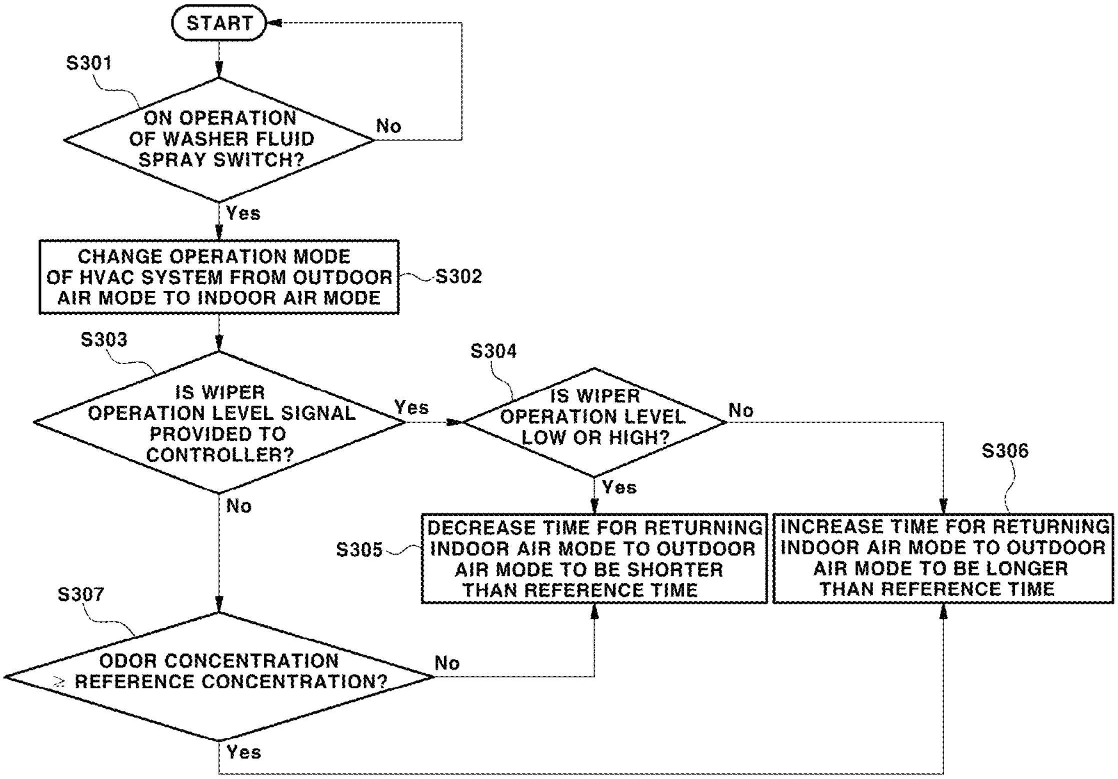
FIG. 4 is a flowchart illustrating a method for controlling switching between an indoor air recirculation mode and an outdoor air recirculation mode of a vehicle according to still another embodiment of the present disclosure.

FIG. 4 is a flowchart illustrating a method for controlling switching between an indoor air recirculation mode and an outdoor air recirculation mode of a vehicle according to still another embodiment of the present disclosure.

First, the controller 10 determines whether an ON operation signal of the washer fluid spray switch 11 is received (S301).

In a case where the controller 10 receives the ON operation signal from the washer fluid spray switch 11, the controller 10 controls changing the operation mode of the HVAC system from the outdoor air recirculation mode to the indoor air recirculation mode (S302).

Accordingly, as the operation mode of the HVAC system switches from the outdoor air recirculation mode to the indoor air recirculation mode, it is possible to primarily prevent the washer fluid odor from entering the vehicle cabin.

Then, the controller 10 determines whether a windshield wiper operation level signal is transmitted from the windshield wiper switch 14 (S303).

In a case where the controller 10 receives the windshield wiper operation level signal from the windshield wiper switch 14, the controller 10 determines whether the windshield wiper operation level is a low or high level or an intermediate level on the basis of the windshield wiper operation level signal provided from the windshield wiper switch 14 (S304), and then, controls decreasing the time for returning the indoor air recirculation mode to the outdoor air recirculation mode to be shorter than a preset reference time (e.g., 1 minute) in a case where the windshield wiper operation level is the low or high level (S305), and controls increasing the time for returning the indoor air recirculation mode to the outdoor air recirculation mode to be longer than the reference time in a case where the windshield wiper operation level is the intermediate level (S306).

Accordingly, in a case where the windshield wiper operation level is the low or high level, since the washer fluid sprayed onto the windshield glass may be washed away by repeated wiping according to the low or high level speed of the windshield wiper to thereby reduce the washer fluid odor, the time for returning the indoor air recirculation mode to the outdoor air recirculation mode may be shortened. On the other hand, in a case where the windshield wiper operation level is the intermediate level in which one or two wiping operations are performed, since the odor of the washer fluid remaining on the windshield glass and the cowl top panel may continue to flow into the vehicle cabin, the time for returning the indoor air recirculation mode to the outdoor air recirculation mode may be increased, thereby easily preventing the odor of the residual washer fluid from entering the vehicle cabin.

In a case where it is determined in step S303 that the windshield wiper operation level signal is not provided to the controller 10, a step of measuring an odor concentration of the washer fluid flowing into the vehicle cabin from the odor sensor 16 and a step of providing an odor concentration signal from the odor sensor 16 to the controller 10 may be performed.

Accordingly, the controller 10 receives the ON operation signal from the washer fluid spray switch 11 and changes the operation mode of the HVAC system from the outdoor air recirculation mode to the indoor air recirculation mode, and then, compares the odor concentration of the washer fluid with the reference concentration on the basis of an odor concentration signal from the odor sensor (S307).

As a result of the comparison, in a case where the odor concentration of the washer fluid is lower than the reference concentration, the controller 10 controls decreasing the time for returning the indoor air recirculation mode to the outdoor air recirculation mode to be shorter than the preset reference time (e.g., 1 minute) (S305), and in a case where the odor concentration of the washer fluid is equal to or higher than the reference concentration, the controller 10 controls increasing the time for returning the indoor air recirculation mode to the outdoor air recirculation mode to be longer than the reference time (S306).

Accordingly, in a case where the odor concentration of the washer fluid is lower than the reference concentration, the time for returning the indoor air recirculation mode to the outdoor air recirculation mode may be shortened, whereas in a case where the odor concentration of the washer fluid is equal to or higher than the reference concentration, since the odor of the washer fluid remaining on the windshield glass and cowl top panel may continue to flow into the vehicle cabin, the time for returning the indoor air recirculation mode to the outdoor air recirculation mode may be increased. Accordingly, it is possible to prevent the odor of the residual washer fluid from entering the vehicle cabin.

Figure 5:
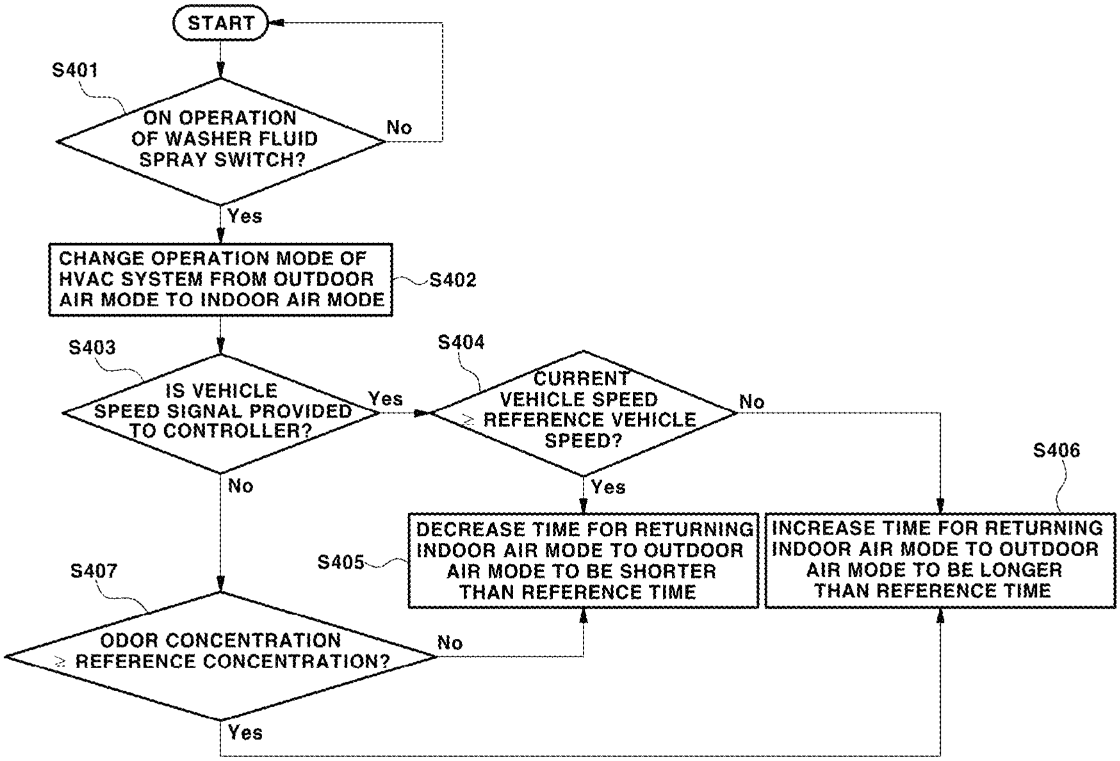
FIG. 5 is a flowchart illustrating a method for controlling switching between an indoor air recirculation mode and an outdoor air recirculation mode of a vehicle according to further still another embodiment of the present disclosure.

FIG. 5 is a flowchart illustrating a method for controlling switching between an indoor air recirculation mode and an outdoor air recirculation mode of a vehicle according to further still another embodiment of the present disclosure.

First, the controller 10 determines whether an ON operation signal of the washer fluid spray switch 11 is received (S401).

In a case where the controller 10 receives the ON operation signal from the washer fluid spray switch 11, the controller 10 controls changing the operation mode of the HVAC system from the outdoor air recirculation mode to the indoor air recirculation mode (S402).

Accordingly, as the operation mode of the HVAC system switches from the outdoor air recirculation mode to the indoor air recirculation mode, it is possible to primarily prevent the washer fluid odor from entering the vehicle cabin.

Then, the controller 10 determines whether a current vehicle speed signal is received from the vehicle speed sensor (15) (S403).

In a case where the controller 10 receives the vehicle speed signal from the vehicle speed sensor 15, the controller 10 determines whether a vehicle speed is equal to or higher than a reference vehicle speed on the basis of the vehicle speed signal provided from the vehicle speed sensor 15 (S404), and then, controls decreasing the time for returning the indoor air recirculation mode to the outdoor air recirculation mode to be shorter than a preset reference time (e.g., 1 minute) in a case where the vehicle speed is equal to or higher than the reference vehicle speed (S405), and controls increasing the time for returning the indoor air recirculation mode to the outdoor air recirculation mode to be longer than the preset time in a case where the vehicle speed is lower than the reference vehicle speed (S406).

Accordingly, since the washer fluid odor may be quickly removed from the windshield glass by vehicle wind generated at a vehicle speed that is equal to or higher than the reference vehicle speed to thereby reduce the washer fluid odor, the time for returning the indoor air recirculation mode to the outdoor air recirculation mode may be shortened. On the other hand, in a case where the vehicle speed is lower than the reference vehicle speed, since the odor of the washer fluid that remains on the windshield glass and cowl top panel may continue to flow into the cabin even when the vehicle wind acts on the windshield glass, the time for returning the indoor air recirculation mode to the outdoor air recirculation mode may be increased, thereby easily preventing the odor of the residual washer fluid from entering the cabin.

In a case where it is determined in step S403 that the vehicle speed signal is not provided to the controller 10, a step of measuring an odor concentration of the washer fluid flowing into the vehicle cabin from the odor sensor 16 and a step of providing an odor concentration signal from the odor sensor 16 to the controller 10 may be performed.

Accordingly, the controller 10 receives the ON operation signal from the washer fluid spray switch 11 and changes the operation mode of the HVAC system from the outdoor air recirculation mode to the indoor air recirculation mode, and then, compares the odor concentration of the washer fluid with the reference concentration on the basis of an odor concentration signal from the odor sensor (S407).

As a result of the comparison, in a case where the odor concentration of the washer fluid is lower than the reference concentration, the controller 10 controls decreasing the time for returning the indoor air recirculation mode to the outdoor air recirculation mode to be shorter than the preset reference time (e.g., 1 minute) (S405), and in a case where the odor concentration of the washer fluid is equal to or higher than the reference concentration, the controller 10 controls increasing the time for returning the indoor air recirculation mode to the outdoor air recirculation mode to be longer than the reference time (S406).

Accordingly, in a case where the odor concentration of the washer fluid is lower than the reference concentration, the time for returning the indoor air recirculation mode to the outdoor air recirculation mode may be shortened, whereas in a case where the odor concentration of the washer fluid is equal to or higher than the reference concentration, since the odor of the washer fluid remaining on the windshield glass and cowl top panel may continue to flow into the vehicle cabin, the time for returning the indoor air recirculation mode to the outdoor air recirculation mode may be increased. Accordingly, it is possible to prevent the odor of the residual washer fluid from entering the vehicle cabin.

As described above, in adjusting the time for returning the operation mode of the HVAC system from the indoor air recirculation mode to the outdoor air recirculation mode on the basis of any one of factors, which are the information or signals provided from the weather information provider, the rain detection sensor, the windshield wiper switch, and the vehicle speed sensor, a priority or weight may be assigned to each factor.

To this end, the priority or weight for the factor may be arbitrarily adjusted or set by a user through an input unit connected to the controller 10, and the controller 10 may adjust the time for automatically returning the indoor air recirculation mode to the outdoor air recirculation mode using the priority or weight of each factor.

In this way, by assigning the priority or weight to any one of the factors, which are the information or signals provided from the weather information provider, the rain detection sensor, the windshield wiper switch, the vehicle speed sensor, etc., through the input unit, the user is capable of optimizing conditions and the time for automatically returning the indoor air recirculation mode to the outdoor air recirculation mode.

The present disclosure provides the following effects.

First, in a case where the washer fluid is sprayed onto the windshield glass in the outdoor air recirculation mode of the HVAC system, the operation mode of the HVAC system is automatically changed from the outdoor air recirculation mode to the indoor air recirculation mode, thereby making it possible to primarily prevent the washer fluid odor from entering the vehicle cabin.

Second, in a case where the washer fluid is sprayed onto the windshield glass, the operation mode of the HVAC system is automatically changed from the outdoor air recirculation mode to the indoor air recirculation mode, and then, the time for automatically returning the indoor air recirculation mode to the outdoor air recirculation mode is optimally adjusted by increasing or decreasing the time compared to a preset reference time according to weather information, rainfall, a wiper operation level, a vehicle speed, and a washer fluid odor concentration, thereby making it possible to prevent the residual washer fluid odor from entering the vehicle cabin.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A system for controlling switching between an indoor air recirculation mode and an outdoor air recirculation mode of a vehicle comprising:

a washer fluid spray switch;

a weather information provider that provides weather information to a controller;

a rain detection sensor that provides rainfall information to the controller;

a windshield wiper switch that provides a windshield wiper operation level signal to the controller;

a vehicle speed sensor that provides a current vehicle speed detection signal of the vehicle to the controller; and the controller configured to receive an ON operation signal from the washer fluid spray switch, to change an operation mode of an HVAC system from the outdoor air recirculation mode to the indoor air recirculation mode, and to perform control for adjusting a time for returning the indoor air recirculation mode to the outdoor air recirculation mode to be different from a reference time, on the basis of the information or signals provided from the weather information provider, the rain detection sensor, the windshield wiper switch, and the vehicle speed sensor, wherein the controller controls decreasing the time for returning the indoor air recirculation mode to the outdoor air recirculation mode to be shorter than the reference time in a case where the vehicle speed is equal to or higher than a reference vehicle speed, on the basis of the vehicle speed detection signal, and controls increasing the time for returning the indoor air recirculation mode to the outdoor air recirculation mode to be longer than the reference time in a case where the vehicle speed is lower than the reference vehicle speed.

2. The system according to claim 1, wherein the controller controls decreasing the time for returning the indoor air recirculation mode to the outdoor air recirculation mode to be shorter than the reference time in case of rain, on the basis of the weather information provided from the weather information provider, and controls increasing the time for returning the indoor air recirculation mode to the outdoor air recirculation mode to be longer than the reference time in case of non-rain.

3. The system according to claim 1, wherein the controller controls decreasing the time for returning the indoor air recirculation mode to the outdoor air recirculation mode to be shorter than the reference time when a rainfall amount is equal to or greater than a set amount, on the basis of the rainfall information provided from the rain detection sensor, and controls increasing the time for returning the indoor air recirculation mode to the outdoor air recirculation mode to be longer than the reference time when the rainfall amount is less than the set amount.

4. The system according to claim 1, wherein the controller controls decreasing the time for returning the indoor air recirculation mode to the outdoor air recirculation mode to be shorter than the reference time in a case where a windshield wiper operation level is a low or high level, on the basis of the windshield wiper operation level signal provided from the windshield wiper switch, and controls increasing the time for returning the indoor air recirculation mode to the outdoor air recirculation mode to be longer than the reference time in a case where the windshield wiper operation level is an intermediate level.

5. The system according to claim 1, further comprising:

an odor sensor that measures an odor concentration of washer fluid flowing into a cabin of the vehicle and provides an odor concentration signal to the controller.

6. The system according to claim 5, wherein the controller receives the ON operation signal from the washer fluid spray switch to change the operation mode of the HVAC system from the outdoor air recirculation mode to the indoor air recirculation mode, controls decreasing the time for returning the indoor air recirculation mode to the outdoor air recirculation mode to be shorter than the reference time in a case where the odor concentration of the washer fluid is lower than a reference concentration, on the basis of the odor concentration signal from the odor sensor, and controls increasing the time for returning the indoor air recirculation mode to the outdoor air recirculation mode to be longer than the reference time in a case where the odor concentration of the washer fluid is higher than the reference concentration.

7. A method for controlling switching between an indoor air recirculation mode and an outdoor air recirculation mode of a vehicle, the method comprising:

changing an operation mode of an HVAC system from the outdoor air recirculation mode to the indoor air recirculation mode by a controller that receives an ON operation signal from a washer fluid spray switch;

providing weather information to the controller from a weather information provider;

providing rainfall information to the controller from a rain detection sensor;

providing a windshield wiper operation level signal to the controller from a windshield wiper switch;

providing a current vehicle speed detection signal of the vehicle to the controller from a speed sensor; and performing control for adjusting a time for returning the indoor air recirculation mode to the outdoor air recirculation mode to be different from a reference time on the basis of the information or signals provided from the weather information provider, the rain detection sensor, the windshield wiper switch, and the vehicle speed sensor by the controller, wherein the controller controls decreasing the time for returning the indoor air recirculation mode to the outdoor air recirculation mode to be shorter than the reference time in a case where a vehicle speed is equal to or higher than a reference vehicle speed, on the basis of the vehicle speed detection signal, and controls increasing the time for returning the indoor air recirculation mode to the outdoor air recirculation mode to be longer than the reference time in a case where the vehicle speed is lower than the reference vehicle speed.

8. The method according to claim 7, wherein the controller controls decreasing the time for returning the indoor air recirculation mode to the outdoor air recirculation mode to be shorter than the reference time in case of rain, and controls increasing the time for returning the indoor air recirculation mode to the outdoor air recirculation mode to be longer than the reference time in case of non-rain, on the basis of the weather information provided from the weather information provider.

9. The method according to claim 7, wherein the controller controls decreasing the time for returning the indoor air recirculation mode to the outdoor air recirculation mode to be shorter than the reference time when a rainfall amount is equal to or greater than a set amount, on the basis of the rainfall information provided from the rain detection sensor, and controls increasing the time for returning the indoor air recirculation mode to the outdoor air recirculation mode to be longer than the reference time when the rainfall amount is less than the set amount.

10. The method according to claim 7, wherein the controller controls decreasing the time for returning the indoor air recirculation mode to the outdoor air recirculation mode to be shorter than the reference time in a case where a windshield wiper operation level is a low or high level, on the basis of the windshield wiper operation level signal provided from the windshield wiper switch, and controls increasing the time for returning the indoor air recirculation mode to the outdoor air recirculation mode to be longer than the reference time in a case where the windshield wiper operation level is an intermediate level.

11. The method according to claim 7, further comprising:

measuring an odor concentration of washer fluid flowing into a cabin of the vehicle and providing an order concentration signal from the odor sensor to the controller.

12. The method according to claim 11, wherein the controller receives the ON operation signal from the washer fluid spray switch to change the operation mode of the HVAC system from the outdoor air recirculation mode to the indoor air recirculation mode, and then, controls decreasing the time for returning the indoor air recirculation mode to the outdoor air recirculation mode to be shorter than the reference time in a case where the odor concentration of the washer fluid is lower than a reference concentration, on the basis of the odor detection signal from the odor sensor, and controls increasing the time for returning the indoor air recirculation mode to the outdoor air recirculation mode to be longer than the reference time in a case where the odor concentration of the washer fluid is equal to or higher than the reference concentration.

* * * * *